US011831537B2

(12) United States Patent
Tappin et al.

(10) Patent No.: US 11,831,537 B2
(45) Date of Patent: *Nov. 28, 2023

(54) REMOTELY AND DYNAMICALLY INJECTING ROUTES INTO AN IP NETWORK (71) Applicant: T-Mobile USA, Inc., Bellevue, WA (US)

(72) Inventors: John Tappin, Bellevue, WA (US); Rahul Amin, Issaquah, WA (US); Samih Shahin, Redmond, WA (US); Senad Mrndic, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/909,587

(22) Filed: Jun. 23, 2020

(65) Prior Publication Data

US 2020/0322250 A1 Oct. 8, 2020

Related U.S. Application Data (63) Continuation of application No. 15/825,070, filed on Nov. 28, 2017, now Pat. No. 10,715,415.

(51) Int. Cl.
*H04L 45/02* (2022.01)
*H04L 45/74* (2022.01)
(Continued)

(52) U.S. Cl.
CPC .......... *H04L 45/02* (2013.01); *H04L 41/0806* (2013.01); *H04L 45/38* (2013.01);
(Continued)

(58) Field of Classification Search
CPC ..... H04L 45/02; H04L 41/0806; H04L 45/38; H04L 45/74; H04L 41/0213; H04L 61/20; H04L 45/04; H04L 45/122; H04L 45/745
See application file for complete search history.

(56) References Cited

U.S. PATENT DOCUMENTS 6,728,782 B1 4/2004 D'Souza et al.
8,717,909 B1 5/2014 Shekhar et al.
(Continued)

FOREIGN PATENT DOCUMENTS

EP 1881660 A1 * 1/2008 ......... H04L 63/0846
EP 2658184 A1 10/2013
(Continued)

OTHER PUBLICATIONS

International Searching Authority, International Search Report and Written Opinion, PCT Patent Application PCT/US2018/062927, dated Mar. 8, 2019, 14 pages.
(Continued)

*Primary Examiner* — Peter P Chau
(74) *Attorney, Agent, or Firm* — Perkins Coie LLP (57) ABSTRACT

Systems and methods are described herein for remotely and dynamically injecting or installing routes into an Internet Protocol (IP) network. In some embodiments, the systems and methods provide a route injection server as a peer or neighbor node with an IP network. The systems and methods then utilize the route injection server (e.g., remote and dynamic route injection server, or RDRIS) to advertise IP routes to other nodes within the IP network. For example, the RDRIS may send UPDATE messages to other nodes within an IP network, such as via the Border Gateway Protocol (BGP) in order to advertise the IP routes to the other nodes of the IP network.

16 Claims, 6 Drawing Sheets (51) Int. Cl.
  *H04L 45/00* (2022.01)
  *H04L 41/0806* (2022.01)
  *H04L 41/0213* (2022.01)
  *H04L 61/50* (2022.01)

(52) U.S. Cl.
  CPC .......... *H04L 45/74* (2013.01); *H04L 41/0213* (2013.01); *H04L 61/50* (2022.05)

(56) References Cited

U.S. PATENT DOCUMENTS

| | | |
|---|---|---|
| 9,106,530 B1 | 8/2015 | Wang |
| 10,715,415 B2 | 7/2020 | Tappin et al. |
| 2002/0141343 A1 | 10/2002 | Bays |
| 2002/0141378 A1 | 10/2002 | Bays et al. |
| 2002/0165980 A1 | 11/2002 | Brown |
| 2003/0012145 A1 | 1/2003 | Bragg |
| 2003/0204619 A1 | 10/2003 | Bays |
| 2005/0135369 A1 | 6/2005 | Galand et al. |
| 2006/0221971 A1 | 10/2006 | Andrieux et al. |
| 2009/0106449 A1 | 4/2009 | Satterlee et al. |
| 2010/0265956 A1* | 10/2010 | Li .................... H04L 45/04 370/401 |
| 2010/0329153 A1 | 12/2010 | Xu |
| 2012/0167160 A1 | 6/2012 | Carney et al. |
| 2013/0201909 A1 | 8/2013 | Bosch et al. |
| 2013/0259058 A1 | 10/2013 | Vairavakkalai |
| 2015/0043383 A1* | 2/2015 | Farkas .................... H04L 45/22 370/254 |
| 2015/0381493 A1 | 12/2015 | Bansal et al. |
| 2016/0308767 A1 | 10/2016 | Borgione et al. |
| 2017/0195181 A1 | 7/2017 | Birmiwal et al. |
| 2017/0214547 A1 | 7/2017 | Mehta et al. |

FOREIGN PATENT DOCUMENTS

| | | |
|---|---|---|
| JP | 2016034117 | 3/2016 |
| JP | 2017050832 | 3/2017 |

OTHER PUBLICATIONS

"BGP Open Message" with English translation, Oct. 19, 2014, 5 pages.

European Patent Office, Extended European Search Report, EP Patent Application 18882443.7, dated Aug. 2, 2021, 15 pages.

* cited by examiner

FIG. 1

```
Path Attribut - AS_PATH: 65001
  Flags: 0x40: well-known, Transitive, Complete
  Type Code: AS_PATH (2)
  Length: 4
  AS Path segment: 65001
Path Attribut - NEXT_HOP: 10.0.0.1
  Flags: 0x40: well-known, Transitive, Complete
  Type Code: NEXT_HOP (3)
  Length: 4
  [redacted]
Path Attribut - MULTI_EXIT_DISC: 0
  Flags: 0x80: Optional, Non-transitive, Complete
  Type Code: MULTI_EXIT_DISC (4)
  Length: 4
  Multiple exit discriminator: 0
Network Layer Reachability Information (NLRI)
  172.16.2.0/24
    NLRI prefix length: 24
    NLRI prefix: 172.16.2.0 (172.16.2.0)
  172.16.1.0/24
    NLRI prefix length: 24
    NLRI prefix: 172.16.1.0 (172.16.1.0)
```

```
⊞ Path Attribut - AS_PATH: 65001
  ⊞ Flags: 0x40: well-known, Transitive, Complete
    Type Code: AS_PATH (2)
    Length: 4
    AS Path segment: 65001
⊞ Path Attribut - MULTI_EXIT_DISC: 0
  ⊞ Flags: 0x80: Optional, Non-transitive, Complete
    Type Code: MULTI_EXIT_DISC (4)
    Length: 4
    Multiple exit discriminator: 0
⊟ Path Attribut - MP_REACH_NLRI
  ⊞ Flags: 0x80: Optional, Non-transitive, Complete
    Type Code: MP_REACH_NLRI (14)
    Length: 64
    Address family: IPv6 (2)
    Subsequent address family identifier: unicast (1)
    Next hop network address (32 bytes)
    Next hop: fe80::c001:bff:fe7e:0 (16)
    Subnetwork points of attachment: 0
  ⊟ Network layer reachability information (27 bytes)
    ⊞ 2001:db8:1:2::/64
      MP Reach NLRI prefix length: 64
      MP Reach NLRI prefix: 2001:db8:1:2::
    ⊞ 2001:db8:1:1::/64
      MP Reach NLRI prefix length: 64
      MP Reach NLRI prefix: 2001:db8:1:1::
```

```
⊞ Path Attribut - AS_PATH: 65001
  ⊞ Flags: 0x40: well-known, Transitive, Complete
    Type Code: AS_PATH (2)
    Length: 4
  ⊞ AS Path segment: 65001
⊞ Path Attribut - NEXT_HOP: 10.0.0.1
  ⊞ Flags: 0x40: well-known, Transitive, Complete
    Type Code: NEXT_HOP (3)
    Length: 4
⊞ Path Attribut - MULTI_EXIT_DISC: 0
  ⊞ Flags: 0x80: Optional, Non-transitive, Complete
    Type Code: MULTI_EXIT_DISC (4)
    Length: 4
    Multiple exit discriminator: 0
⊟ Network Layer Reachability Information (NLRI)
  ⊞ 172.16.2.0/24
    NLRI prefix length: 24
    NLRI prefix: 172.16.2.0 (172.16.2.0)
  ⊞ 172.16.1.0/24
    NLRI prefix length: 24
    NLRI prefix: 172.16.1.0 (172.16.1.0)
```

```
⊞ Path Attribut - AS_PATH: 65001
  ⊞ Flags: 0x40: well-known, Transitive, Complete
    Type Code: AS_PATH (2)
    Length: 4
  ⊞ AS Path segment: 65001
⊞ Path Attribut - MULTI_EXIT_DISC: 0
  ⊞ Flags: 0x80: Optional, Non-transitive, Complete
    Type Code: MULTI_EXIT_DISC (4)
    Length: 4
    Multiple exit discriminator: 0
⊞ Path Attribut - MP_REACH_NLRI
  ⊞ Flags: 0x80: Optional, Non-transitive, Complete
    Type Code: MP_REACH_NLRI (14)
    Length: 64
    Address family: IPv6 (2)
    Subsequent address family identifier: unicast (1)
    Next hop network address (32 bytes)
    ▓▓▓▓▓▓▓▓▓▓▓▓▓▓▓▓▓▓▓▓▓▓▓▓
      Next hop: fe80::c001:bff:fe7e:0 (16)
    Subnetwork points of attachment: 0
  ⊞ Network layer reachability information (27 bytes)
    ⊞ 2001:db8:1:2::/64
        MP Reach NLRI prefix length: 64
        MP Reach NLRI prefix: 2001:db8:1:2::
    ⊞ 2001:db8:1:1::/64
        MP Reach NLRI prefix length: 64
        MP Reach NLRI prefix: 2001:db8:1:1::
```

REMOTELY AND DYNAMICALLY INJECTING ROUTES INTO AN IP NETWORK

CROSS REFERENCE TO RELATED APPLICATIONS

This application is a continuation of U.S. patent application Ser. No. 15/825,070, filed on Nov. 28, 2017, entitled REMOTELY AND DYNAMICALLY INJECTING ROUTES INTO AN IP NETWORK, which is hereby incorporated by reference in its entirety.

BACKGROUND

Internet Protocol (IP) networks utilize various routing protocols that communicate on a control plane of the IP networks to create and maintain routing tables, which facilitate the forwarding of data packets within a data plane between nodes (e.g., routers) of the IP network.

The Border Gateway Protocol (BGP) is one of the most widely deployed routing protocols on IP networks. BGP is used internally within an organization, in the form of the iBGP (internal BGP), as well as to communicate routing information between different service providers, in the form of eBGP (external BGP).

BGP, as well as other routing protocols, has various inherent drawbacks associated with injecting IP routes into a network. Often, the IP routes are injected when certain conditions are satisfied. For example, BGP-enabled nodes advertise IP routes using CLI (command line interface) commands, such as Network, and/or Redistribution commands, or utilize Aggregating route commands. However, in order for a node to advertise the routes, the node's routing table should already include the routes. Otherwise, the node has to learn the routes from peer nodes (e.g., neighbor nodes), other than in cases where the node utilizes some synchronization techniques. Such requirements are restrictive to injecting IP routes into a network, and hinder or prevent IP address mobility within the network.

These and other drawbacks exist with respect to current or conventional IP address mobility techniques for IP networks.

BRIEF DESCRIPTION OF THE DRAWINGS

Embodiments of the present technology will be described and explained through the use of the accompanying drawings.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Overview

Systems and methods are described herein for remotely and dynamically injecting or installing routes into an Internet Protocol (IP) network. In some embodiments, the systems and methods provide a route injection server as a peer or neighbor node with an IP network. The systems and methods then utilize the route injection server (e.g., remote and dynamic route injection server, or RDRIS) to advertise IP routes to other nodes within the IP network. For example, the RDRIS may send UPDATE messages to other nodes within an IP network, such as via the Border Gateway Protocol (BGP) in order to advertise the IP routes to the other nodes of the IP network.

A routing protocol, such as BGP, is by its nature dynamic and adaptive. However, as described herein, rules associated with IP mobility within the networks limit the nodes of the networks to install routes in their routing tables, and subsequently advertise the installed routes. The systems and methods, via the RDRIS, which may be provisioned as a peer with the networks, circumvents or avoids such rules in order to provide for the remote and dynamic injection of routes into the IP networks (e.g., at various nodes within the IP networks).

For example, the RDRIS may include a request component or module that is configured to receiving a request to inject a specified IP route to one or more peer nodes of the BGP network, and a transmission component that is configured to transmit an UPDATE message that includes information identifying the specified IP route to the peer nodes of the network.

The systems and methods, therefore, may be utilized with any routing protocols, and may be utilize to inject (or, install or otherwise add) IP routes into a network for a variety of applications. Further, the system and methods facilitate the decoupling of the physical infrastructure IP configuration and provisioning from applications hosted by the infrastructure. Also, in providing the remote injection of routes, the systems and methods can develop the mobility of applications and other functionalities (e.g., VOIP using SIP UE endpoints), by bypassing various architectural standards, such as IMS (Internet Multimedia System), among other benefits.

In the following description, for the purposes of explanation, numerous specific details are set forth in order to provide a thorough understanding of embodiments of the present technology. It will be apparent, however, that embodiments of the present technology may be practiced without some of these specific details.

Examples of a Suitable Network Environment

Figure 1:
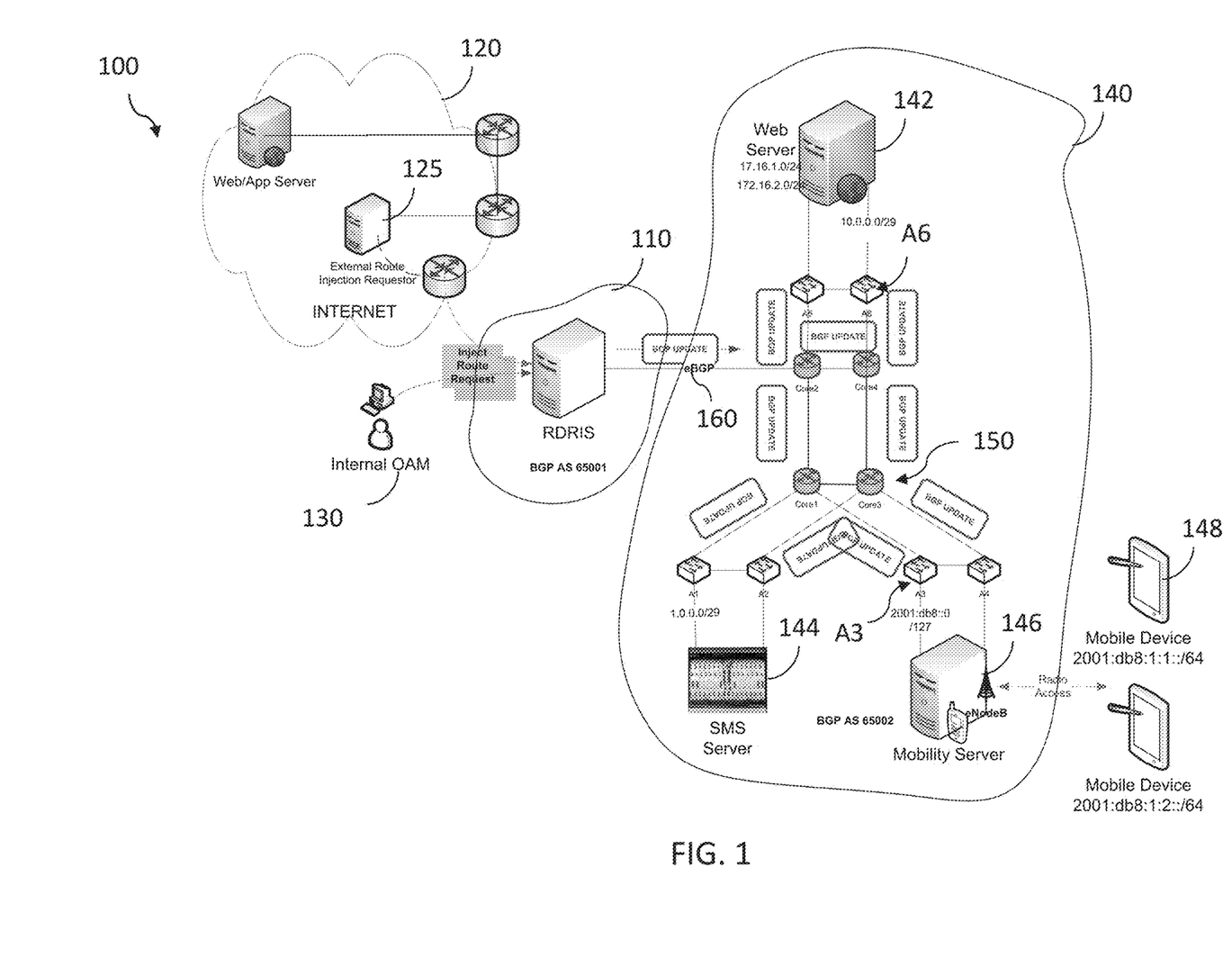
FIG. 1 is a block diagram illustrating a suitable network environment for injecting routes into an IP network.

As described herein, in some embodiments, the systems and methods facilitate and/or provide IP address mobility within IP networks, such as IP networks utilizing the BGP routing protocol. FIG. 1 is a block diagram illustrating a suitable network environment 100 for injecting routes into an IP network.

The network environment 100 includes a route injection server 110, such as a remote and dynamic route injection server (RDRIS), which may be provisioned as a node, such as a peer or neighbor node, within an IP network. The route injection server 110 acts as an eBGP peer/neighbor in a control plane or application layer of a BGP routed network 140, and may circumvent conventional BGP route advertisement rules, to advertise a particular or specified requested route in the BGP routed IP network. For example, any particular BGP route advertisement rule changes are made to the route injection server 110. The changes may not affect other nodes 150 of the network 140.

In some embodiments, BGP route installation rules changes are made at a BGP protocol level, such that the changes propagate to some or all of the nodes 150 running the BGP in the network 110. For example, the changes in BGP route installation rules allow a BGP node 150 to install routes in an associated routing table of the node (that it would not have otherwise). As will be described in more detail herein, the nodes 150 receive route information via a BGP UPDATE message 160 transmitted to the network 140 from the route injection server 110.

In some cases, the network 140 is an iBGP network that utilizes mesh iBGP peering, route reflector, and/or other available BGP functionality, such that BGP UPDATE messages advertise and propagate to each and every node 150 of the network 140.

As described herein, the route injection server 110 is configured and/or provisioned as a peer node on the network 140 to advertise IP routes to other nodes 150 of the network 140. The server 110 sends the UPDATE message 160 similar to any BGP routed node. However, the server 110 manipulates, modifies, or changes a "Next Hop" field of the message 160. For example, the server 110 enables the BGP protocol to create a BGP UPDATE message to send to the peer nodes 150. Then, the route injection server 110 modifies the Next Hop field of the message 160 to provide the IP route to inject to the nodes 150, and thus to reflect dynamic routing injection of the route to the network 140.

The route injection server 110 may receive a request to inject a specified or particular route or routes from a variety of entities, including an Internal Operation and Management (OAM) entity 130 and/or an external company 120.

The OAM entity 130 may include a team (e.g., a team at company A) that wishes to provision routing for various applications, such as a web server, mobility server, and other services deployed on their network infrastructure. For example, the OAM team may want to provision 2 IPv4 subnets pools (e.g., 172.16.1.0/24 and 172.16.2.0/24) on a web server 142 behind a node A6. The web server link IP connecting node A6 is 10.0.0.1. The OAM 130 sends the route injection request to the route injection server 110. The server 110 sends or transmits the UPDATE message 150 to the BGP network 140 of company A.

Figure 2A:
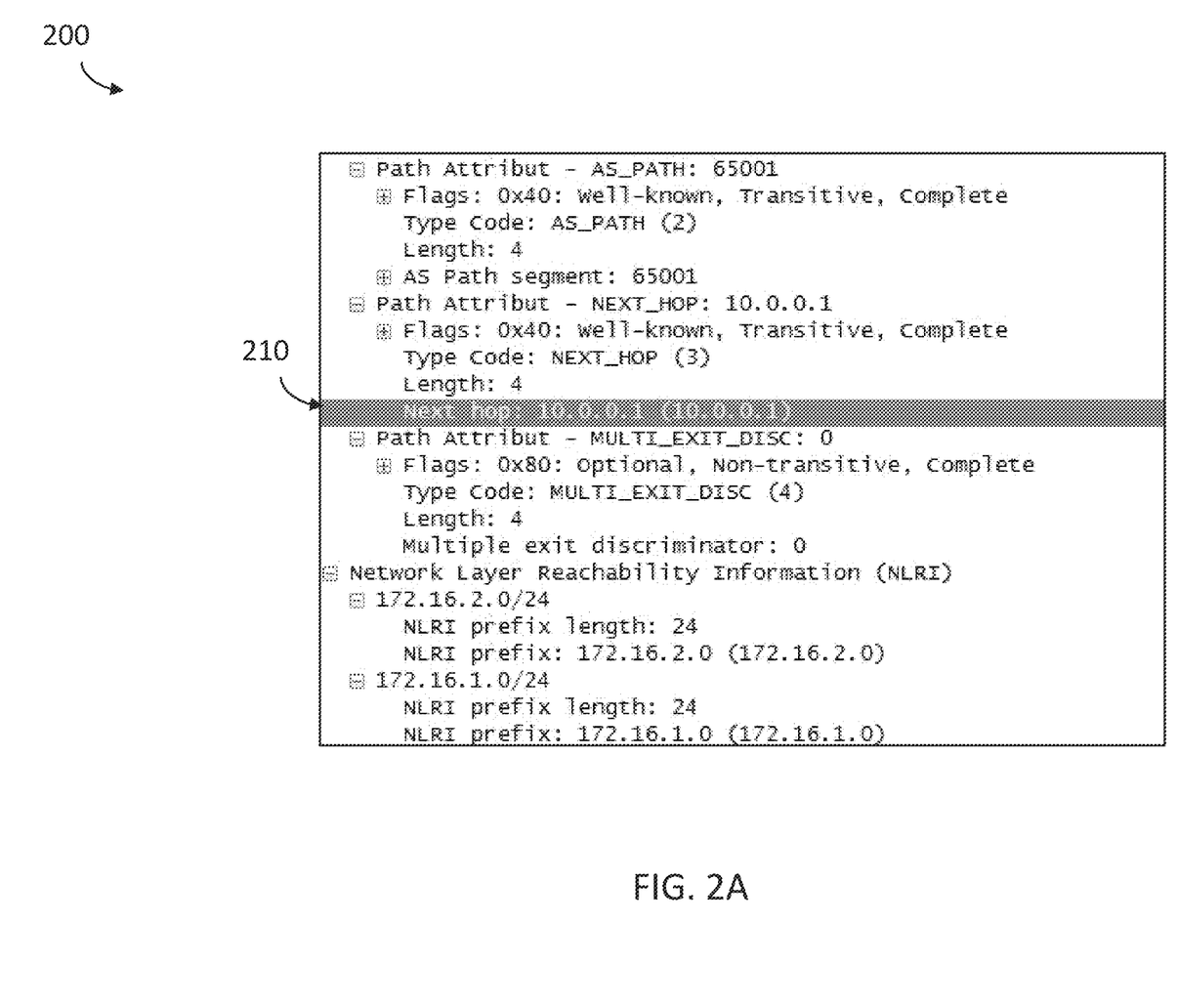
FIGS. 2A-2D are diagrams illustrating example message packets utilized to inject routes into IP networks.

FIG. 2A depicts an example UPDATE message 200. The message 200 contains various fields, including a Next Hop field 210, which contains the web server link information for the IP node A6, or "10.0.0.1 (10.0.0.1)."

Referring back to FIG. 1, an external server 125 of the external company 120 (e.g., company B) wishes to dynamically change routing paths for its mobile devices 148, with respect to the network 140 provided by company A, when some of its mobile customers are roaming on the network 140 of company A. However, company B wants to maintain the IP addresses of the mobile devices, as well as any new addresses provided by company B.

To do so, the remote external server 125 sends a request to the route injection server 110 to route 2001:db81:1::/64 and 2001:db8:1:2::/64 to 2001:db8::1, where 2001:db81:1::/64 and 2001:db8:1:2::/64 are IP addresses assigned by company B, which company B now wants to route to company A's network 140. Company B only knows that the path to get to the mobile devices 148 has a Last Hop IP address of 2001:db8::1. Although the external server 125 lacks knowledge of the internal network of company A, the route injection server 110 is able to route data traffic within the network 140 as requested by the external server 125. For example, the route injection server 110 sends the BGP UPDATE message 160 packet capture for IPv6 to the BGP network 140 of company A, to inject the requested routes into the network 140.

Figure 2B:
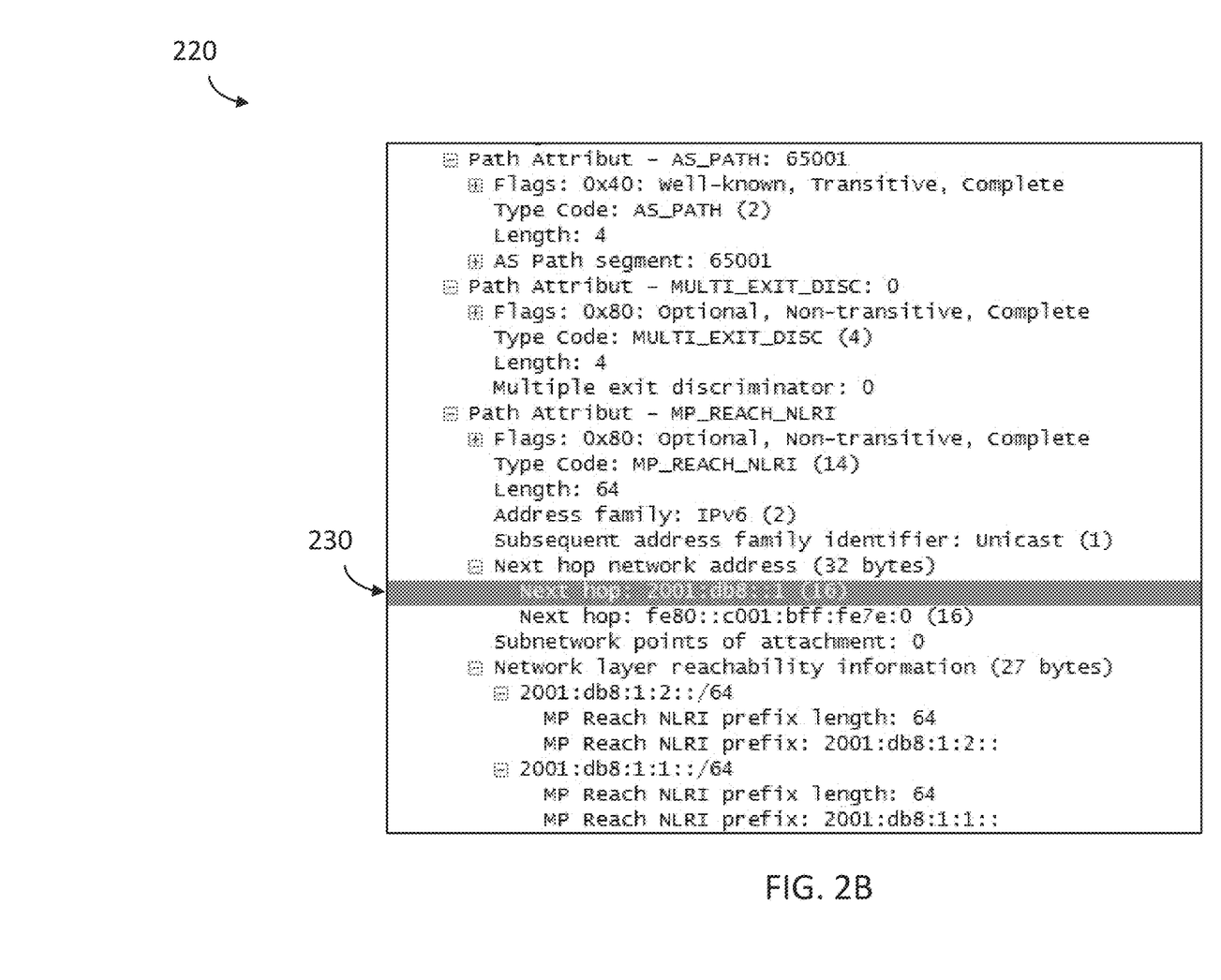

FIG. 2B depicts an example UPDATE message 220. The message 220 contains various fields, including a Next Hop field 230, which contains the Last Hop IP address of "2001:db8::1 (16)." The BGP UPDATE message 220 traverses through the nodes 150 in the network 140 that are running the BGP protocol.

Each of the nodes examine the BGP UPDATE message, and the nodes that meet specific criteria will install the routes into associated routing tables, and start advertising the routes. For example, node A3, in front of mobility server 148, installs and advertises the requested IPv6 routes as per company B's request. Of course, other nodes in the network 140, such as nodes associated with the SMS server 146, may install and advertise the injected routes to their associated routing tables.

Thus, in some embodiments, the route injection server 110 facilitates the injection of routes to various nodes 150 (e.g., node A3 and/or node A6) within the network 140.

FIG. 1 and the discussion herein provide a brief, general description of a suitable computing environment 100 in which the injection of routes can be performed. Although not required, aspects of the systems and methods are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some cases, the communication network 140 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 140 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications network. Thus, the user device is configured to operate and switch among multiple frequency bands for receiving and/or transmitting data.

Examples of Remotely and Dynamically Injecting Routes to an IP Network

As described herein, the system and methods facilitate the remote and dynamic injection of routes, such as routes supported by the BGP routing protocol, or other similar protocols, within an IP network. A route injection server 110 may be configured, provided, implemented, or located as a peer node within the IP network.

The route injection server 110 may include functional modules or components that are implemented with a combination of software (e.g., executable instructions, or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the particular functions that are described herein.

The server 110, therefore, may provide a system that includes a request component or module that is configured to receiving a request to inject a specified IP route to one or more peer nodes of the BGP network 140, and a transmission component or module that is configured to transmit an UPDATE message (e.g., message 160) that includes information identifying the specified IP route to the peer nodes 150 of the network 140.

Figure 3:
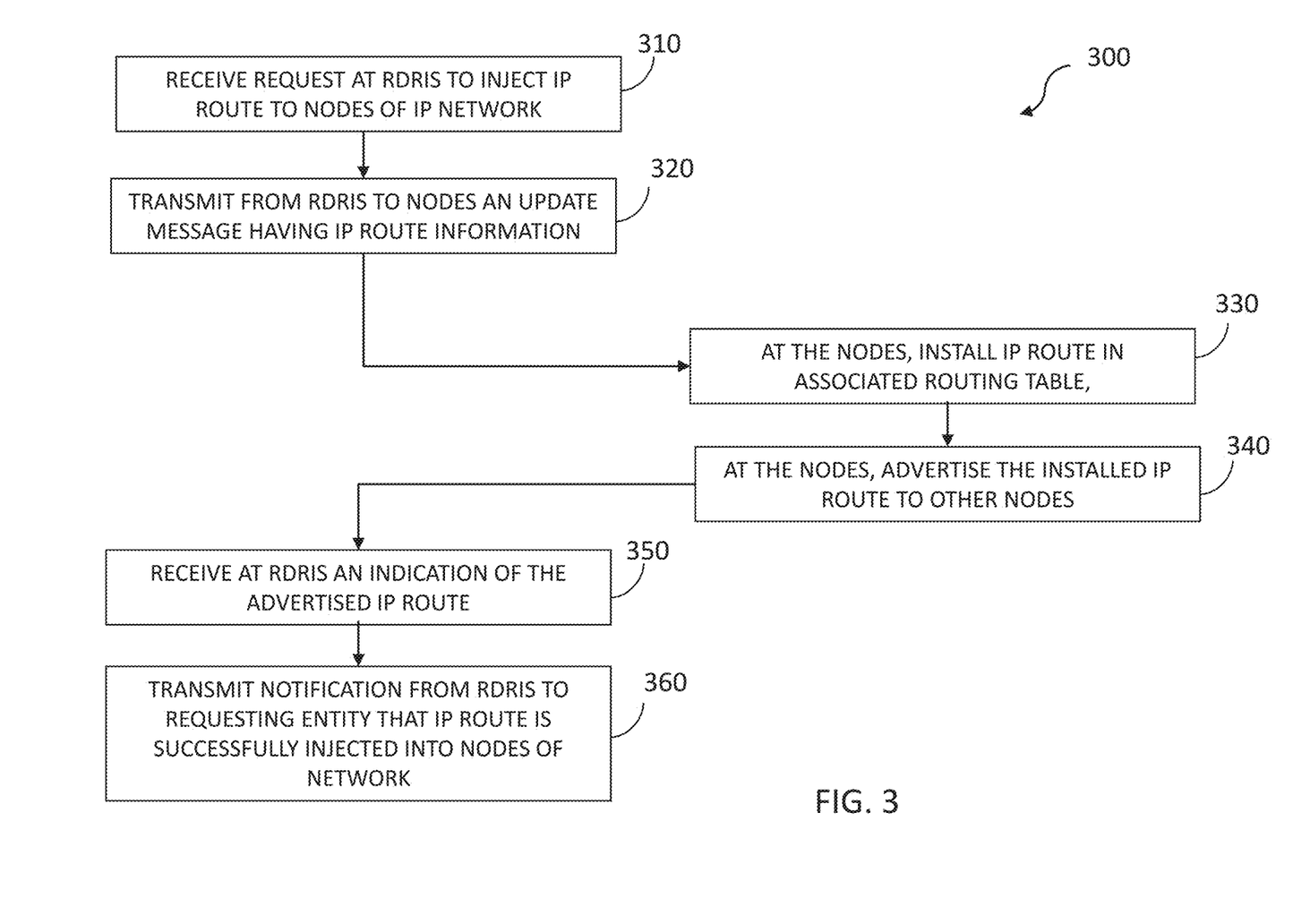
FIG. 3 is a flow diagram illustrating a method for dynamically injecting routes into an IP network.

The systems and methods perform various operations, methods, or processes for injecting routes into IP networks. FIG. 3 is a flow diagram illustrating a method 300 for dynamically injecting routes into an IP network. The method 300 may be performed by the route injection server 110 and/or one or more of the nodes 150 and, accordingly, is described herein merely by way of reference thereto. It will be appreciated that the method 300 may be performed on any suitable hardware or components of an IP network.

In operation 310, the route injection server 110, such as the RDRIS, receives a request to inject a specified IP route to one or more nodes of the IP network. For example, the server 110 may receive the request from the Internal Operation and Management (OAM) 130 requestor, which transmits the request to inject the specified IP route in order to provision routing for applications within the IP network, and/or from the external server 125 of the company 120, in order to dynamically change routing paths for mobile devices 148 associated with the entity that are roaming on the IP network 140.

In some embodiments, before, received any requests to inject routes, the systems and methods provision the route injection server 110 as a BGP peer or neighbor within a control plane or application layer of the BGP routed network 140. Thus, the server 110 acts or operates as a peer node within the network 140.

In operation 320, the server 110 transmits to the one or more nodes of the IP network an UPDATE message that includes information identifying the specified IP route. For example, the server 110 transmits the UPDATE message 160 having a modified next hop field, to facilitate injection of the specified IP route, and/or to facilitate advertising the specified IP route to the one or more nodes 150 of the IP network 140.

In operation 330, each node (e.g., node A3 or node A6), of the nodes 150 of the network 140 that meets a specified route injection criteria defined by an entity that transmitted the request to the route injection server 110 installs the specified IP route in a routing table associated with the node, and, in operation 340, advertises the installed IP route to other nodes 150 of the IP network 140.

For example, when a next hop entry of the associated routing table for the node includes a directly attached or connected network that matches network layer reachability information (NLRI) within the UPDATE message, the node installs the NLRI to the associated routing table without changing the next hop entry. However, when the next hop entry of the associated routing table for the node matches the NLRI of an UPDATE message configured to withdraw an IP route from one or more nodes, the node deletes the NLRI from the associated routing table.

As described herein, the BGP UPDATE message 160 is used to advertise and withdraw routes to/from a node participating in a BGP routed IP network, such as one or more of nodes 150. Such changes to the RDRI functionality facilitate how a particular BGP node installs a route learned from the BGP UPDATE message 160. A node may incorporate various techniques, such as those described herein, when installing routes to routing tables.

Figure 2C:
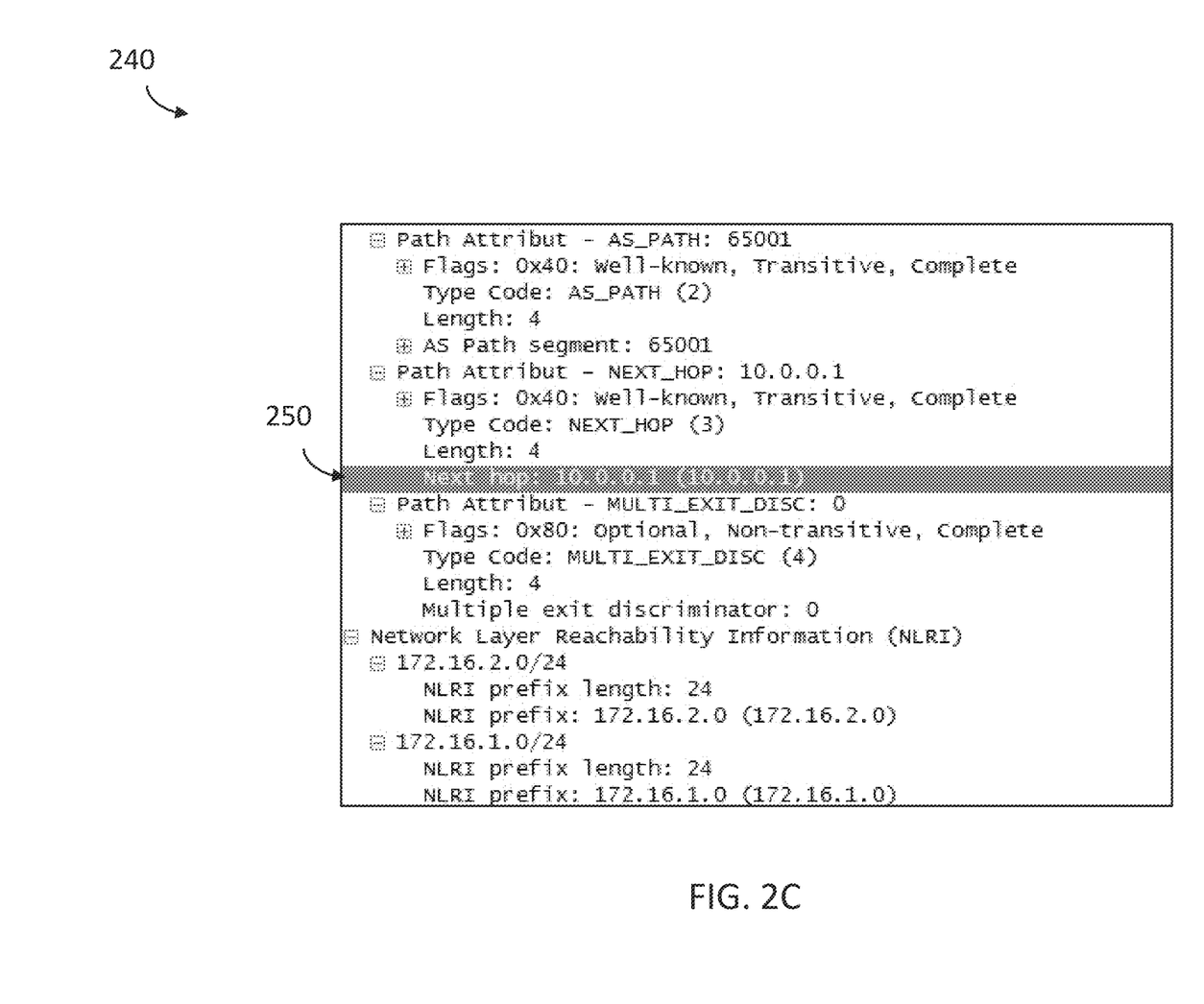

For example, when a node installs an IP route, the NLRI will be routed and forwarded based on the Next Hop IP in the routing table. FIG. 2C depicts an example UPDATE message 240. The message 240 contains various field related details for both IPv4 and IPv6, including a Next Hop field 250, which contains "10.0.0.1 (10.0.0.1)."

As depicted, when node A6 has 10.0.0.1 as part of its attached network, and node A6 is advertising that IP use any routing protocol to other nodes in its network, then node A6 will install the routes: 172.16.1.0/24 and 172.16.2.0/24 (discovered from the server 110 and other BGP peers) in its routing table, with 10.0.0.1 as the Next Hop address. Thereafter, node A6 will route or forward data traffic destined to 172.16.1.0/24 and 172.16.2.0/24 over the 10.0.0.1 link contained in the modified Next Hop field 250.

Figure 2D:
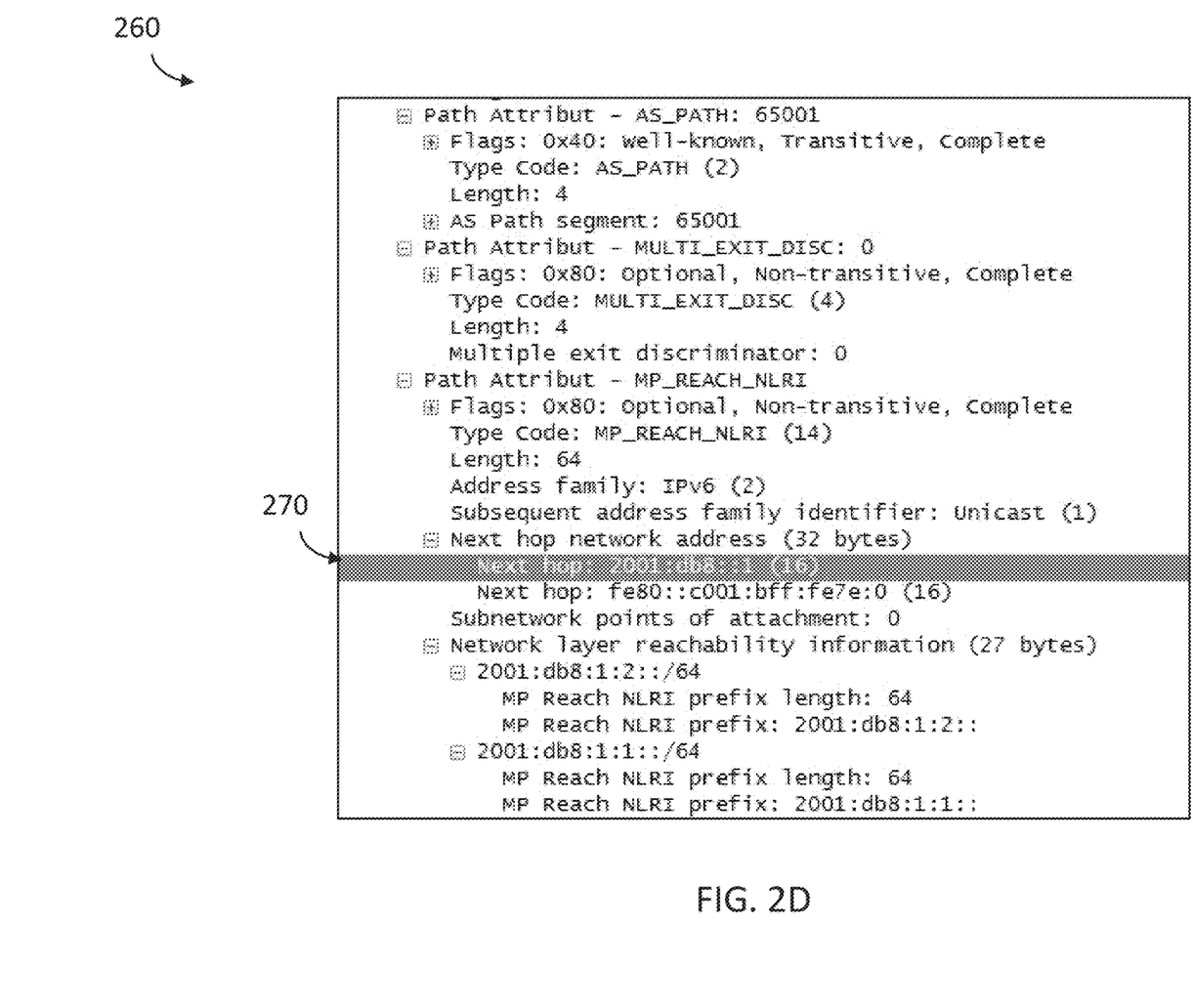

FIG. 2D depicts another example UPDATE message 260. The message 260 contains various field related details for both IPv6, including a Next Hop field 270, which contains "2001:db8::1 (16)." When node A3 has 2001:db8::1 as part of its attached network, and node A3 is advertising that IP use any routing protocol to other nodes in its network, then node A6 will install the routes: 2001:db8:1:1::/64 and 2001:db8:1:2::/64 (discovered from the server 110 and other BGP peers) in its routing table with 2001:db8::1 as the Next Hop address. Thereafter, node A3 will route or forward data traffic destined to 2001:db8:1:1::/64 and 2001:db8:1:2::/64 over the 2001:db8::1 link contained in the modified Next Hop field 270.

Conversely, in some cases, when the Next Hop address in a received "Update message to withdraw route" exists in the routing table of the node, the node shall delete that NLRI from its routing table and stop advertising that route.

Referring back to FIG. 3, the route injection server 110, in operation 350, receives an indication of the advertised IP route from at least one of the nodes that installed the specific IP route in an associated routing table. For example, the server 110 receives route advertising from node A3 for the same route that was injected, and stops advertising the route.

In some cases, once the intended node starts advertising the route with a better metric than the server 110, the server 110 stops advertising that particular route. However, if the server 110 does not receive an advertised route with better metrics after a certain configurable timer expires, the server 110 may determine that there is no node that can route the subnet or route, and the server 110 may also stop advertising that subnet or route (and generate an alert or alarm).

The server 110, therefore, determines that the route is successfully injected into the network 140, and, in operation 360, notifies the requesting entity about the injection of the route. For example, the server 110 transmits a notification to the entity (e.g., OAM 130) that transmitted the request to the route injection server, where the notification indicates the advertised IP route was successfully injected into the one or more nodes 150 of the IP network 140.

Thus, as described herein, the systems and methods provision a route injection server 110, such as the RDRIS, as a BGP peer within a control plane or application layer of a BGP routed network, and transmit UPDATE messages from the route injection server to the one or more nodes of the IP network, which include network layer reachability information (NLRI) identifying specified IP routes to be injected into the network. The systems and methods, therefore, provide remote and dynamic address mobility for the network via the dynamic injection of routes into the nodes of the network, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. At least one non-transitory computer-readable medium carrying instructions which, when executed by a computing system communicatively coupled with an Internet Protocol (IP) network, cause the computing system to perform operations, the operations comprising:
   receiving a request to inject a specified IP route to multiple nodes of the IP network;
   transmitting, to each specified node of the multiple nodes that meets a specified route injection criteria defined by an entity that transmitted the request, an UPDATE message that includes network layer reachability information (NLRI) identifying the specified IP route; and
   at each specified node of the multiple nodes that meets the specified route injection criteria defined by the entity that transmitted the request,
      installing the specified IP route in a routing table associated with the specified node,
         wherein, when a next hop entry of the routing table associated with the specified node indicates a directly attached or connected network that matches the NLRI, the specified node installs the NLRI to the routing table associated with the specified node without changing the next hop entry; and
      advertising the installed IP route to other nodes of the IP network.

2. The non-transitory computer-readable medium of claim 1, the operations further comprising:
   receiving an indication of the installed IP route from another node of the IP network that installed the specified IP route in an associated routing table; and
   transmitting a notification to the entity that transmitted the request in response to receiving the indication.

3. The non-transitory computer-readable medium of claim 1, wherein the IP network utilizes a border gateway protocol (BGP).

4. The non-transitory computer-readable medium of claim 1, wherein the multiple nodes of the IP network include border gateway protocol (BGP) peers within an IP routing network.

5. The non-transitory computer-readable medium of claim 1, wherein the receiving the request to inject the specified IP route to the multiple nodes of the IP network includes receiving the request from an Internal Operation and Management (OAM) requestor that transmits the request to inject the specified IP route in order to provision routing for applications within the IP network.

6. The non-transitory computer-readable medium of claim 1, wherein the receiving the request to inject the specified IP route to the multiple nodes of the IP network includes receiving the request from an external server of the entity in order to dynamically change routing paths for mobile devices associated with the entity that are roaming on the IP network.

7. The non-transitory computer-readable medium of claim 1, wherein the IP network is a border gateway protocol (BGP) routed network, and wherein the operations further comprise:
   provisioning a route injection server as a BGP peer within a control plane or application layer of the BGP routed network; and
   transmitting the UPDATE message from the route injection server to the multiple nodes of the BGP routed network.

8. A method for use with an Internet Protocol (IP) network, the method comprising:
   receiving a request to inject a specified IP route to multiple nodes of the IP network;
   transmitting, to each specified node of the multiple nodes that meets a specified route injection criteria defined by an entity that transmitted the request, an UPDATE message that includes network layer reachability information (NLRI) identifying the specified IP route; and
   at each specified node of the multiple nodes that meets the specified route injection criteria defined by the entity that transmitted the request,
      installing the specified IP route in a routing table associated with the specified node,
         wherein a next hop entry of the routing table associated with the specified node indicates a directly attached or connected network that matches the NLRI, and
         wherein the specified node installs the NLRI in the routing table associated with the specified node without changing the next hop entry in response to the next hop entry of the routing table associated with the specified node indicating the directly attached or connected network that matches the NLRI; and
      advertising the installed IP route to other nodes of the IP network,
   wherein a plurality of the multiple nodes meet the specified route injection criteria.

9. The method of claim 8, further comprising:
   receiving an indication of the advertised installed IP route from another node of the IP network that installed the specified IP route in an associated routing table; and
   transmitting a notification to the entity that transmitted the request in response to receiving the indication.

10. The method of claim 8, wherein the IP network utilizes a border gateway protocol (BGP).

11. The method of claim 8, wherein the multiple nodes of the IP network include border gateway protocol (BGP) peers within an IP routing network.

12. The method of claim 8, wherein the receiving the request to inject the specified IP route to the multiple nodes of the IP network includes receiving the request from an Internal Operation and Management (OAM) requestor that transmits the request to inject the specified IP route in order to provision routing for applications within the IP network.

13. The method of claim 8, wherein the receiving the request to inject the specified IP route to the multiple nodes of the IP network includes receiving the request from an external server of the entity in order to dynamically change routing paths for mobile devices associated with the entity that are roaming on the IP network.

14. The method of claim 8, wherein the IP network is a border gateway protocol (BGP) routed network, and wherein the method further comprises:
- provisioning a route injection server as a BGP peer within a control plane or application layer of the BGP routed network; and
- transmitting the UPDATE message from the route injection server to the multiple nodes of the BGP routed network.

15. A computing system, comprising:
- at least one hardware processor; and
- at least one non-transitory memory carrying instructions that, when executed by the at least one hardware processor, cause the computing system to perform operations comprising:
  - receiving, at a route injection server provisioned as a border gateway protocol (BGP) peer within a control plane or application layer of a BGP routed IP network, a request to inject a specified Internet Protocol (IP) route to multiple nodes of the BGP routed IP network;
  - transmitting, from the route injection server and to each specified node of the multiple nodes that meets a specified route injection criteria defined by an entity that transmitted the request, an UPDATE message that includes network layer reachability information (NLRI) identifying the specified IP route; and
  - at each specified node of the multiple nodes that meets the specified route injection criteria defined by the entity that transmitted the request, installing the specified IP route in a routing table associated with the specified node,
    - wherein, when a next hop entry of the routing table associated with the specified node indicates a directly attached or connected network that matches the NLRI, the specified node installs the NLRI to the routing table associated with the specified node without changing the next hop entry; and
  - advertising the installed IP route to other nodes of the BGP routed IP network,
    - wherein a plurality of the multiple nodes meet the specified route injection criteria.

16. The computing system of claim 15, wherein the operations further comprise:
- receiving an indication of the advertised installed IP route from another node of the BGP routed IP network that installed the specified IP route in an associated routing table; and
- transmitting a notification to the entity that transmitted the request in response to receiving the indication.

* * * * *